United States Patent [19]

Hishinuma et al.

[11] 3,847,572

[45] Nov. 12, 1974

[54] APPARATUS FOR DESULFURIZING FLUE GAS

[75] Inventors: Yukio Hishinuma; Norio Arashi; Zensuke Tamura, all of Hitachi, Japan

[73] Assignee: Hitachi, Ltd., Tokyo, Japan

[22] Filed: July 3, 1972

[21] Appl. No.: 268,453

[30] Foreign Application Priority Data
June 14, 1971 Japan.............................. 46-51720

[52] U.S. Cl................................ 55/179, 55/73
[51] Int. Cl............................................ B01d 53/04
[58] Field of Search ............. 55/73, 77, 79, 34, 179, 55/180, 390

[56] References Cited
UNITED STATES PATENTS
3,686,832  8/1972  Hori et al............................. 55/179
3,403,496  10/1968  Ahlander et al....................... 55/73

Primary Examiner—Charles N. Hart
Attorney, Agent, or Firm—Craig & Antonelli

[57] ABSTRACT

An apparatus for desulfurizing combustion flue gas, which comprises an adsorbent-packed compartment consisting of a plurality of segments and common spaces at the top and the bottom of the compartment, the common spaces at the top and the bottom being communicated with an outlet common flue duct, and an inlet common flue duct, respectively, and water sprayers being provided for each segment. Sulfate component is adsorbed onto the adsorbent from a flue gas by passing the flue gas through each segment, and desorbed by passing washing water through the segment.

10 Claims, 4 Drawing Figures

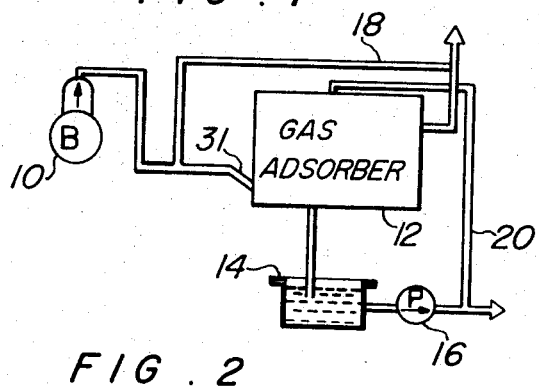
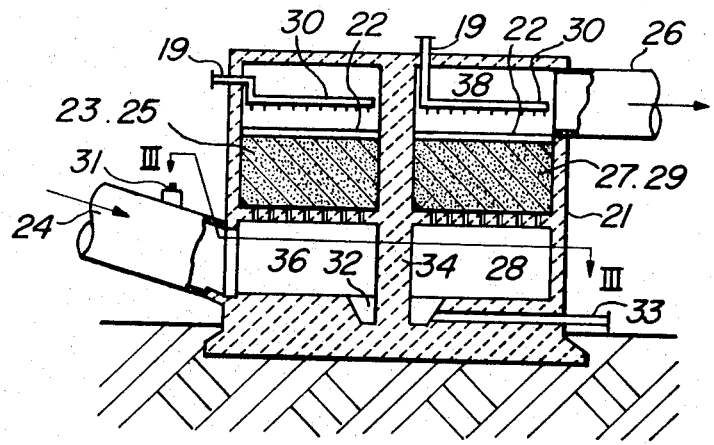
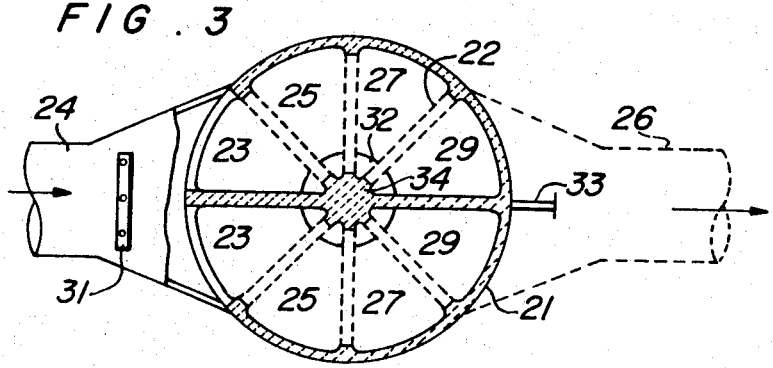

APPARATUS FOR DESULFURIZING FLUE GAS

This invention relates to an apparatus for desulfurizing flue gas, and more particularly to an apparatus for removing sulfur dioxide gas, etc., from combustion flue gas, using such an adsorbent as activated carbon, etc.

In many cases, a fixed bed type apparatus for desulfurizing the flue gas has been heretofore used, but recently a treating gas capacity has been increased with capacity increases of the fuelfired power stations, etc., and consequently the apparatus for desulfurizing the flue gas has been made larger in sizes, especially in column diameter of the adsorbing column, to reduce the treating cost. Heretofore, a number of the adsorbing columns have been provided in parallel, and the adsorption and desorption have been carried out by batch operation control based on a damper manipulation. Therefore, there have been observed the following disadvantages.

1. Desulfurizing efficiency is lowered due to channelling of a treating gas or washing solution, caused by the increase in the column diameter of the adsorbing column.
2. Complication of batch operation control due to damper manipulation.

An object of the present invention is to solve these disadvantages and provide a novel apparatus for desulfurizing the flue gas. That is to say, the object of the present invention is to eliminate the decrease in desulfurizing efficiency due to the channelling of treating gas and washing solution and the complication of operation control based on the damper manipulation, as mentioned above, and provide an apparatus for desulfurizing the flue gas based on segmentation of a packed compartment and cyclic gas flow and washing solution flow to these segments.

The present invention is characterized, first of all, by segmentation of an adsorbing column of larger size into a plurality of segments, whereby the channelling of gas and washing solution flows is reduced, as compared with the conventional single adsorbing column of large size, and the desulfurizing efficiency is greatly increased.

The present invention is further characterized by carrying out adsorption by gas flow and desorption by washing in a cyclic manner in said plurality of segments, whereby the complicated damper manipulation heretofore encountered can be evaded through a non-damper system, the desulfurizing cost can be reduced, and the operation control can be stably assured.

According to the present invention, the following effects can be attained. Operation based on the non-damper system can be carried out in accordance with the pressure drop of the gas through the packing layer. The channelling of the washing solution can be prevented. Stirring of the solution by the gas can be promoted, and the desulfurizing efficiency is increased. An economical apparatus for desulfurizing the flue gas can be provided thereby.

Now, the present invention will be explained in detail, referring to the accompanying drawings.

FIG. 1 is a schematic flow diagram showing the present apparatus for desulfurizing the flue gas.

FIG. 2 is a vertical cross-sectional view of the present adsorbing apparatus.

FIG. 3 is a cross-sectional view along the line III—III of FIG. 2.

Figure 4:
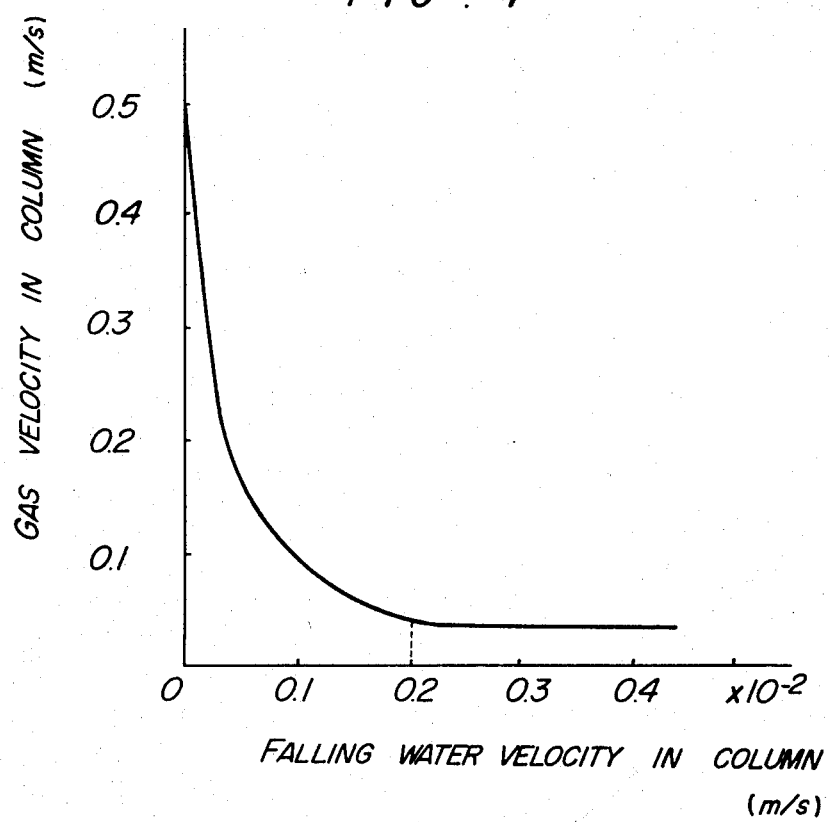
FIG. 4 is a diagram showing flow characteristics of the present adsorbing apparatus.

In FIG. 1, a combustion flue gas from a boiler 10 is led to a gas adsorber 12, where activated carbon is packed as an adsorbing agent. By passing the flue gas through the activated carbon, the activated carbon adsorbs $SO_2$ from the flue gas, and purifies the flue gas. The activated carbon, which has adsorbed $SO_2$ in this manner, is desorbed and regenerated by a washing solution transferred through a system 20 by a pump 16.

The washing solution desorbs the sulfate component in the activated carbon and the sulfate component is passed to a water tank 14 as a dilute sulfuric acid solution. Concentration operation can be carried out at the same time by recycling. A system 18 is a bypass piping for the flue gas, and numeral 31 is a wet-type cooler provided in a flue duct near the flue gas inlet of the adsorber 12 to roughly scrub the dusts from the flue gas and simultaneously cool the flue gas, which controls a quantity of washing water by a device (not shown by Figure).

In FIGS. 2 and 3 showing details of an embodiment of the gas adsorber 12, a grating 28 is provided at a middle level within a cylindrical adsorber column 21, and the activated carbon is packed over the grating as a fixed bed.

According to the present invention, the activated carbon-packed layer is radially segmented into a plurality of compartments 23, 25, 27 and 29 by vertical partition plates 22, and the activated carbon is individually packed in each compartment. Therefore, no channelling of the gas flow and washing solution flow appears, different from the single whole packing without any segmentation, and consequently the adsorbing efficiency can be increased. When said vertical partition plates 22 of acid-resistant ceramic material are used, the acid resistance of the apparatus can be improved.

Water sprayers 30 are provided over each segmented compartment 23, 25, 27 and 29, and a washing solution from the washing solution recycle system 20 of FIG. 1 is poured therein through a nozzle 19. When the washing solution is sprayed over the activated carbon, the desorption of sulfate component adsorbed on the activated carbon, that is, the regeneration of the activity of the activated carbon, is carried out successively from one compartment to another. During that period, the flue gas is cooled by water spraying through the wet type cooler 31, and led to the compartment through the inlet flue duct 24 of the absorber. The flue gas ascends through the packing materials from openings of the fixed bed (gratings) 28, and the sulfur dioxide gas is adsorbed onto the packing materials. Then, the flue gas is vented to the atmosphere from a stack (not shown in the drawing) through an outlet flue duct 26. On the other hand, the washing solution is collected in a washing solution reservoir 32 common to each compartment, and is led to a washing solution tank 14 of FIG. 1 through a nozzle 33. At that time, the compartment 23 is in process of desorption and regeneration of the activated carbon, and other compartments 25, 27 and 28 are in process of adsorption including the drying of the activated carbon by the flue gas. When the desorption and regeneration of the compartment 23 are over, the compartment is brought into the process of adsorption. While, at the beginning, the activated carbon is dried with the flue gas, it adsorbs the sulfur dioxide gas, but the activated carbon can adsorb the sulfur dioxide in a dry state with time.

When the compartment 23 enters into the process of drying and adsorption in this manner, the compartment 25 enters into the process of desorption and regeneration, and the sulfate component adsorbed on the activated carbon is desorbed by spraying the washing solution over the activated carbon.

During the processes of adsorption and desorption, the flue gas is not shielded by any shield plate and flows in a reciprocal proportion to a pressure drop of the gas stream by the washing solution sprayed in each compartment. Therefore, the washing solution from the sprayer 30 flows down while filling the packing layer of the activated carbon, and the resistance to the gas flow at that portion is increased. That is, the flow rate of the gas stream is reduced, and the same effect as in the case of using a damper can be obtained.

In FIG. 4, operating characteristics showing the gas flow velocity and the falling velocity of the washing water within the gas adsorber 12 are shown. That is, when the flow velocity of the falling water is about 0.2 m/sec, the flow velocity of the gas is about one-tenth of the gas velocity when no washing water is passed, that is, it becomes 0.05 m/sec. In other words, a remarkable gas shielding effect can be attained by the washing water.

When the process of desorption by the washing solution is carried out cyclically from one compartment to another with an appropriate time cycle, a stable desulfurizing effect can be expected without any fluctuation in the flue gas during the processes.

The present embodiment is directed to uniform distribution of gas stream by shielding the central portion against the flow of the flue gas, where the disturbance in gas flow and washing solution flow due to an unbalance of the pressure can be prevented by successively washing a pair of segmented compartments in a symmetrical position among four pairs of 8 segmented compartments, and a stable operation can be continuously assured therby.

Furthermore, a leakage of a small amount of the flue gas into the packing layer during the process of desorption and regeneration of the activated carbon can stir the washing solution and can improve the desorption effect.

What is claimed is:

1. An apparatus for desulfurizing flue gas comprising: a column; an adsorbent bed in said column divided into a plurality of compartments; common spaces provided at the upper portions and the lower portions of the column and communicating with each other through the compartments; inlet and outlet common flue ducts communicating with the lower and upper common spaces, respectively; and water sprayers provided at the upper common space above each of the compartments; the upper and lower common spaces being free of valves for individually controlling the flow of flue gas and desulfurized flue gas through respective compartments in said adsorbent bed.

2. An apparatus according to claim 1, wherein a flue gas cooler is provided in the inlet common flue duct.

3. An apparatus according to claim 2, wherein a device for controlling the quantity of spraying water is provided at the water sprayers.

4. An apparatus according to claim 1, wherein a device for controlling the quantity of spraying water is provided at the water sprayers.

5. An apparatus for desulfurizing flue gas comprising: a column; an adsorbent bed in said column divided into a plurality of vertically oriented compartments; an upper common space in said column above the adsorbent beds communicating with each compartment in said bed; a lower common space in said column below the adsorbent bed communicating with each compartment in said bed; an inlet flue duct communicating with the lower common space; an outlet common flue duct communication with the upper common space; and a plurality of water sprayers, at least one water sprayer above each compartment of said bed; each compartment in said bed communicating with the upper and lower common spaces by respective flow paths which are free of valves for individually controlling the flow of flue gas or desulfurized flue gas through respective compartments in said absorbent bed.

6. An apparatus according to claim 5, further comprising a control means associated with each of said water sprayers, each of said control means controlling the quantity of water sprayed by its associated water sprayer.

7. An apparatus according to claim 6, further including means for cooling flue gas in said inlet flue duct.

8. An apparatus according to claim 7, wherein said means for cooling is a means for spraying water through the gas passing through said inlet duct.

9. An apparatus according to claim 7, further including means for holding said adsorbent beds in place in said column.

10. An apparatus according to claim 9, wherein said means for holding comprises a grating.

* * * * *